United States Patent [19]
Boehringer et al.

[11] 3,854,780
[45] Dec. 17, 1974

[54] MULTI-STAGE BRAKE VALVE

[75] Inventors: Wilfred E. Boehringer, Fullerton; James V. Walker, Redondo Beach, both of Calif.

[73] Assignee: McDonnell Douglas Corporation, Santa Monica, Calif.

[22] Filed: June 8, 1973

[21] Appl. No.: 368,089

Related U.S. Application Data
[62] Division of Ser. No. 170,782, Aug. 11, 1971.

[52] U.S. Cl............................. 303/21 F, 137/110
[51] Int. Cl............................................ B60t 11/28
[58] Field of Search............ 137/110; 303/2, 30, 50, 303/21 F; 188/181 A

[56] References Cited
UNITED STATES PATENTS

| | | |
|---|---|---|
| 2,032,143 | 2/1936 | McCune .............................. 303/30 |
| 3,514,161 | 5/1970 | Frayer............................. 303/21 F |
| 3,515,440 | 6/1970 | Every et al. ...................... 303/21 F |
| 3,588,191 | 6/1971 | Atkin................................. 303/2 X |

*Primary Examiner*—William R. Cline
*Attorney, Agent, or Firm*—G. W. Finch; W. J. Jason; D. L. Royer.

[57] ABSTRACT

A multi-stage, three port valve in which input commands are fed to a first stage which normally modulates the flow of medium to an actuator. During high demand conditions, differential pressures generated within the valve cause one or more other stages of the valve to automatically supplement medium flow as required.

12 Claims, 6 Drawing Figures

MULTI-STAGE BRAKE VALVE

This is a division of application Ser. No. 170,782, filed Aug. 11, 1971.

BACKGROUND OF THE INVENTION

As aircraft and other large mobile devices have become larger and larger and as such devices have been equipped with hydraulic brake systems including anti-skid mechanisms, the brake valve flow capacities have had to be greatly increased. This is due to the necessarily large capacity brake actuators and the fact that anti-skid mechanisms may drastically modulate the brake pressure to obtain the most efficient application of the brakes. In addition, brake valves must be stable and must be able to maintain a smooth pressure versus position gradient for manual braking conditions requiring pressures and flows less than those required during anti-skid operation. The prior art valves have not been able to provide both the smooth gradient required for manual braking and a stable pressure for anti-skid application when the very high flow capacities required for anti-skid operation are being furnished. This is because the prior art valves are either of a one stage design which greatly limits the amount of flow that can pass therethrough or of a two-stage design wherein the second stage valve includes a three port pilot valve for driving the second stage three port valve. This latter scheme while able to furnish the large flow capacities required for an anti-skid function becomes very sensitive during manual brake operation because a very small fluid volume is required to shuttle the second stage spool between its full off and full on travel limits. Therefore, smooth operation during manual braking suffers to enable the large flow capacities required by the anti-skid mechanism.

BRIEF DESCRIPTION OF THE PRESENT EMBODIMENT

The present multi-stage valve includes a first stage for normal flow conditions and at least one other stage for the large flow conditions. The subject valve when used in a brake system modulates hydraulic fluid pressure in proportion to the pilot's pedal effort either directly to the brakes for the manual brake operating mode or indirectly through the anti-skid mechanism when the anti-skid is being employed. In the former operating mode, the first stage of the valve is generally capable of handling the task of brake application with little or no assistance from the parallel second stage valve. However, in the latter operating mode, efficient anti-skid performance demands that a preselected pressure output from the valve shall be maintained with minimal variation to the anti-skid mechanism as valves therein cycle to momentarily release and then reapply pressure to the brake actuators. The second or more stages of the valve, because of the extreme flow and response requirements, are used to automatically augment the first stage flow output to prevent excessive drop in brake pressure upon anti-skid valve opening. The second or more stages then automatically throttle their outputs to prevent excessive pressure overshoot after brake actuator filling is completed.

It is therefore an object of the present invention to provide a brake valve which can enable smooth and sensitive application of brakes and yet at the same time, provide large flows required during anti-skid cycling.

Another object of the present invention is to provide a multi-stage brake valve with a minimum of operating parts therein.

Another object of the present invention is to provide a valve of a configuration that can be used in any application where accurate control is required from a three port, high flow capacity valve.

These and other objects and advantages of the present invention will become apparent after considering the following detailed specification which covers preferred embodiments thereof in conjunction with the accompanying drawings wherein:

DETAILED DESCRIPTION OF THE PRESENT EMBODIMENTS

Figure 1:
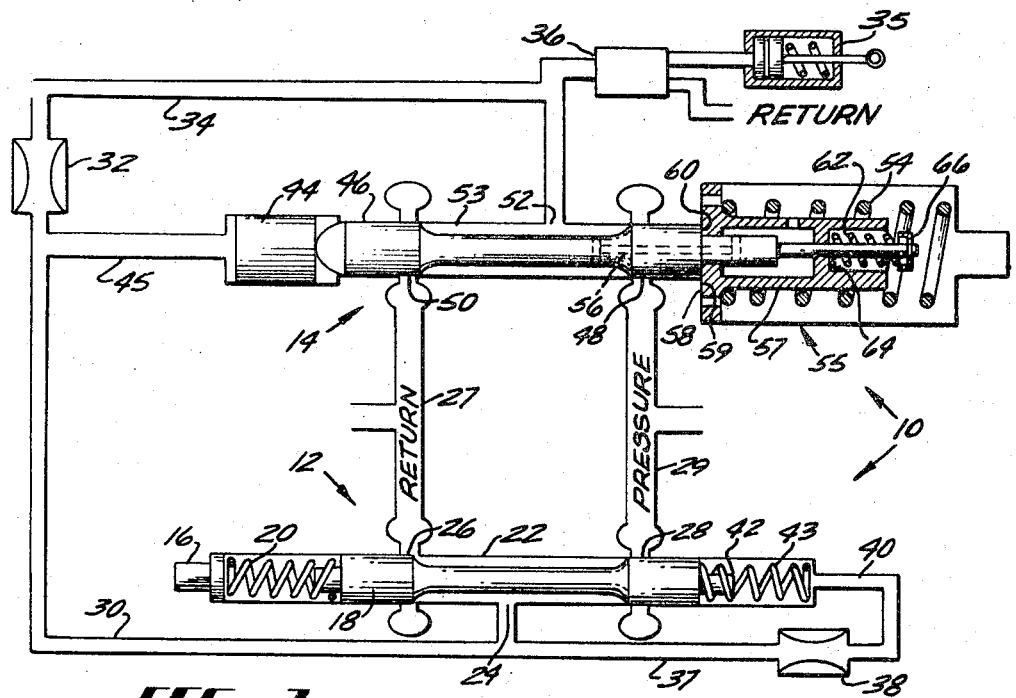
FIG. 1 is a diagrammatic representation of a two stage brake valve of the present invention with the first and second stage spools thereof in their nonactuated positions.

Referring to the drawings more particularly by reference numbers, number 10 in FIG. 1 refers to a valve including a first stage 12 and a second stage 14 which is constructed according to the present invention.

Input motion is fed to the valve 10 by means of an input member 16 which is resiliently connected to a valve spool 18 in the first stage 12 by an input spring 20. The spool 18 includes a passageway 22 which normally forms a flow passage between an output port 24 and a return port 26 of the first stage 12.

With the orientation as shown in the figures, an actuation input is applied to the first stage 12 by moving the input member 16 to the right. The spring 20 transfers this movement to the spool 18 to move it to the right to close the flow passage between the output port 24 and the return port 26 and return line 27. Further rightward movement of the spool 18 causes the passageway 22 to form a flow passage between a pressure port 28 and the output port 24. This causes pressurized fluid from a pressure line 29 to flow through the output port 24, a line 30, a flow restrictor 32, and a line 34 to whatever kind of actuator is being controlled by the valve 10 which, as aforesaid, is usually a brake actuator 35 which may include anti-skid means 36. As the line 30 pressurizes due to the flow of pressurized fluid therein, flow is also induced through a line 37, a flow restrictor 38 and line 40 to act against the right end 42 of the spool 18. The flow restrictor 38 is positioned between lines 37 and 40 to provide damping for the first stage 12. The restriction provided by the flow restrictor 38 is usually chosen to assure the proper operational stability of spool 18. The flow restrictor 38 causes the pressure in line 40 acting against the end 42 of the spool 18 to lag behind the pressure in lines 30 and 37. When the pressure in the lines 30 and 37 approaches the pressure commanded by the input applied to member 16, the force applied to the spool end 42 in combination with the force exerted by a preloaded spring 43 acting thereon is sufficient to overcome the spring 20 and to move the spool 18 back to the left. As the pressure in the lines 30 and 37 reaches the commanded pressure, the spool 18 is moved far enough to the left to close the flow passage between the pressure port 28 and the output port 24. This equilibrium is maintained as long as the input force applied to the input member 16 is maintained constant.

When the input force is reduced, the pressure in the line 40 acting against the spool end 42 in combination with the force exerted by the spring 43 is sufficient to move the spool 18 further to the left and thereby open a flow passage between the output port 24 and the return port 26. This reduces pressure at the output port 24. As the pressure at the output port 24 is reduced the flow restrictor 38 causes the pressure reduction in the line 40 to lag the pressure reduction in lines 30 and 37. This also assists in maintaining the spool 18 to the left. When the input is abruptly reduced, the pressure differential caused by the flow restrictor causes the spool to move left past the position shown in FIG. 1 to thereby open a larger flow passage between the output port 24 and the return port 26. As the pressure in lines 30 and 37 approaches zero, the pressure differential across the flow restrictor 38 drops and the spool 18 moves back to the right to the position shown in FIG. 1 wherein the valve 10 is ready for another actuation cycle.

The above discussion assumes that the fill or dump flows demanded of the valve 10 never exceeded those which could be accommodated by the first stage 12. When this is not the case, the second stage 14 comes into play. For example, if a large abrupt input is applied to the input member 16, the first stage 12 completely opens the flow passage between the pressure port 28 and the output port 24 so that a relatively large flow passages through the flow restrictor 32. This causes a differential pressure to appear across the flow restrictor 32. The high side of this differential pressure is applied to a piston 44 by means of line 45 while the low side is applied to the second stage spool 46 as will be described.

Figure 2:
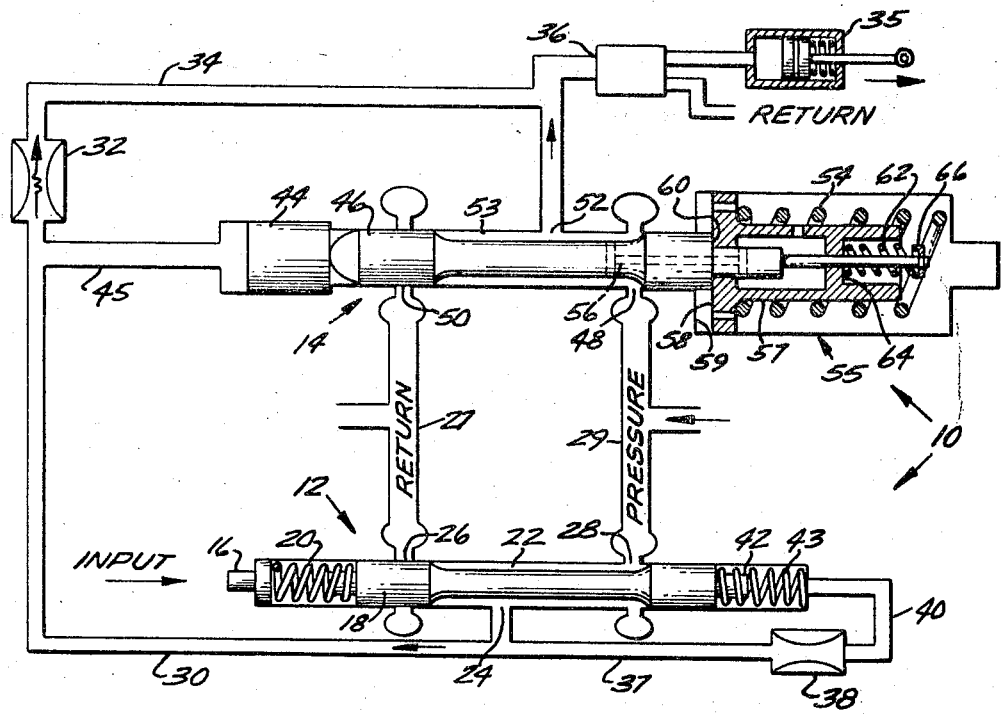
FIG. 2 is the diagrammatic representation of the valve of FIG. 1 with the first and second stage spools in position to allow maximum flow to the output thereof.

As shown, piston 44 is designed with a slightly greater area than the opposite end of the spool 46. This optional differential area causes the spool 46 to tend to move to the right with increasing static pressures. This makes the second stage more sensitive to pressure differentials across the flow restrictor 32 when high output pressures are present in the valve 10. The piston 44 is operatively connected to the spool 46 and the pressure differential created by high flow through the flow restrictor 32 tends to move the piston 44 and the spool 46 from the positions shown in FIG. 1 toward the full flow positions shown in FIG. 2.

The spool 46 of the second stage 14 normally prevents flow between a pressure port 48, a return port 50 and an output port 52 thereof. As the differential pressure generated by the flow restrictor 32 moves the spool 46 to the right, a passageway 53 formed by the spool 46 opens a flow passage between the pressure port 48 and the ouput port 52 to augment the flow of pressurized fluid being passed by the first stage 12. The motion of the spool 46 to the right is resisted by a relatively large preloaded spring 54 and the low side of the differential pressure which is passed to the right end 55 of the spool 46 by a passageway 56 therethrough. The spring 54 is caged between structure of the second stage 14 and a sleeve 57.

The sleeve 57 includes a first abutment surface 58 which is normally held to the left against an abutment surface 59 of the structure of the second stage 14 by the spring 54. The abutment surface 58 is also adapted to abut an abutment surface 60 of the spool 46. Therefore, when the spool 46 is moved to the right from the null position shown in FIG. 1, it forces the sleeve 57 to the right to compress the spring 54. As the flow requirements diminish, the pressure differential across the flow restrictor 32 is no longer sufficient to overcome the preload of the spring 54 and therefore the spring 54 moves the spool 46 back to the left to the position shown in FIG. 1 with the sleeve 57 in abutment with structure.

Figure 3:
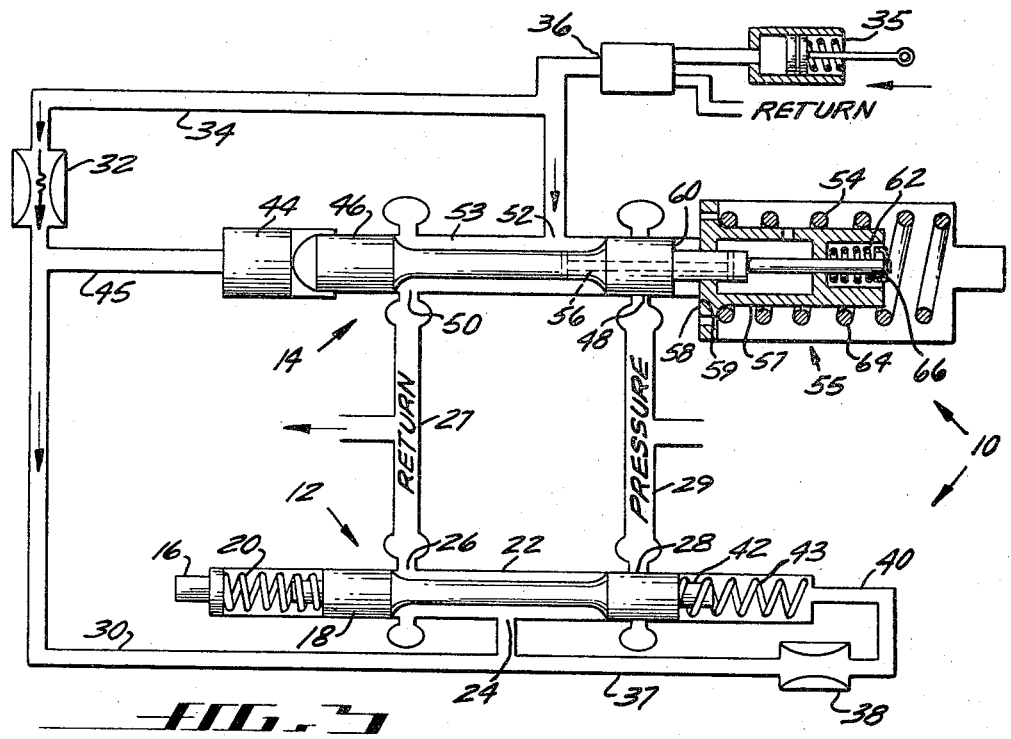
FIG. 3 is a diagrammatic representation of the valve of FIG. 1 with the first and second stage spools moved to positions allowing maximum dumping of the pressure at the output thereof.

If it is desired to gradually release the pressure in the connected actuator 35 it can be done by gradually reducing the input to the first stage which enables the first stage 12 to vent the pressurized fluid through the return port 26 and the return line 27 as aforesaid. However, when it is desired to quickly reduce the pressure the second stage 14 is again called into play. An abrupt release of the input to the first stage 12 causes relatively large flows to pass back through the flow restrictor 32 which again establishes a pressure differential thereacross but in an opposite direction so that line 34 is at a higher pressure than line 45. The pressure in the line 34 is transferred through the passageway 56 and acts on the right end 55 of the spool 46 to move the spool 46 to the left. This leftward motion is resisted by a small spring 62 caged and preloaded between an abutment surface 64 of the sleeve 56 and a collar 66 on the spool 46. The preload of the spring 62 can be overcome by a relatively small pressure differential which allows the spool 46 to move from its port blocking position shown in FIG. 1, to the left opening a flow passage between the output port 52 and the return port 50. This increases the return flow capacity of the valve 10 as shown in FIG. 3.

Figure 4:
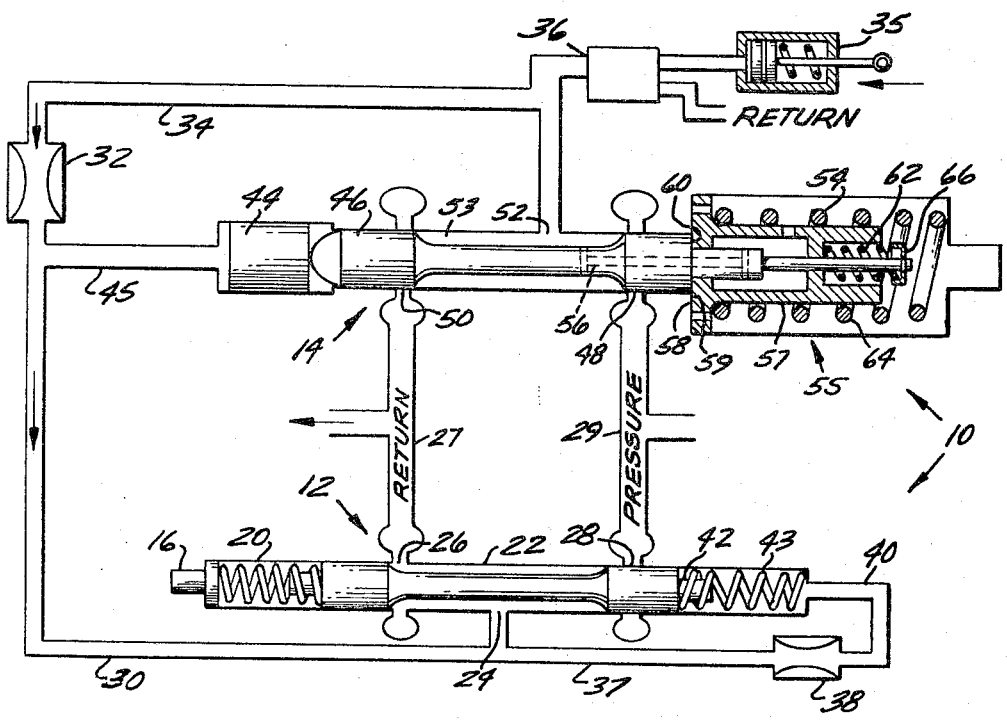
FIG. 4 is a diagrammatic representation of the valve of FIG. 1 with the first and second stage valve spools in positions which allow restricted output pressure dumping or residual pressure dumping.

When the pressure differential across the flow restrictor 32 is reduced to a predetermined value by diminishing flows, the preload of the spring 62 can no longer be overcome and the valve spool 46 moves back to its normal position stopping all flow between the output port 52 and return port 50. From that point on, the return flow to exhaust all of the pressure still present in the actuator 35 passes through the first stage 12. This position of the relative components is shown in FIG. 4.

It should be obvious that the second stage can be activated either by an abrupt manual input applied to the first stage 12 or by the demands of the anti-skid means 36, when the valve 10 is being used to control braking systems. This is because the anti-skid means 36 can create the requirement for almost instantaneous large flow capacities which are sensed by the flow restrictor 32 to activate the second stage 14. It should also be apparent that other stages could be connected either in parallel with the second stage 14 or in series with the second stage and controlled thereby to further enable the augmentation of flow.

Figure 5:
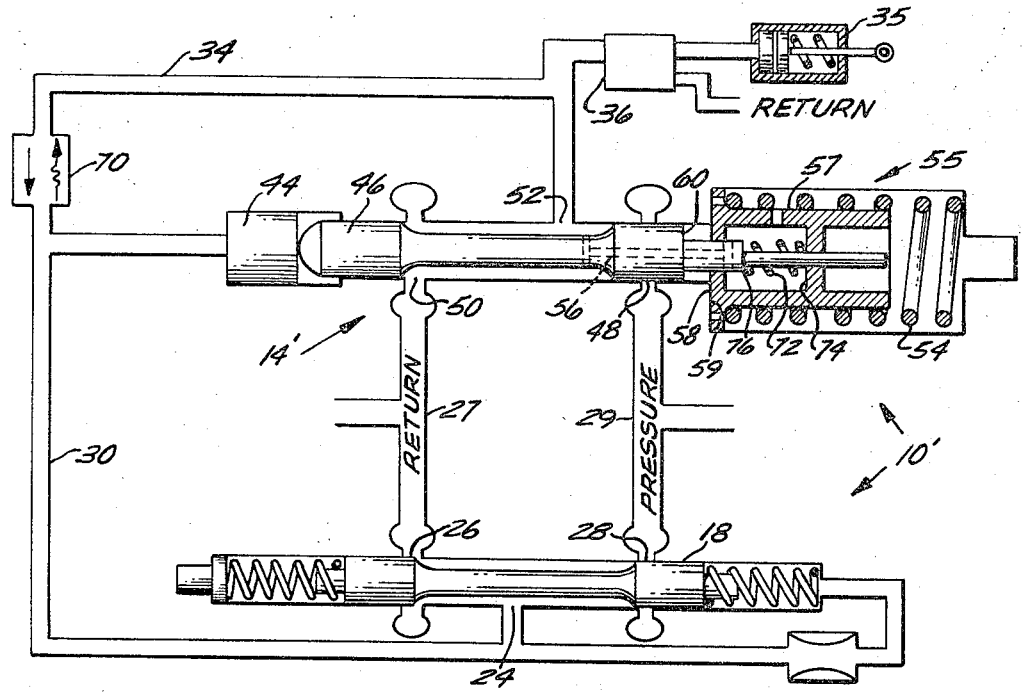
FIG. 5 is a diagrammatic representation of a modified form of the invention having first and second stage valve spools in their nonactuated positions.
Figure 6:
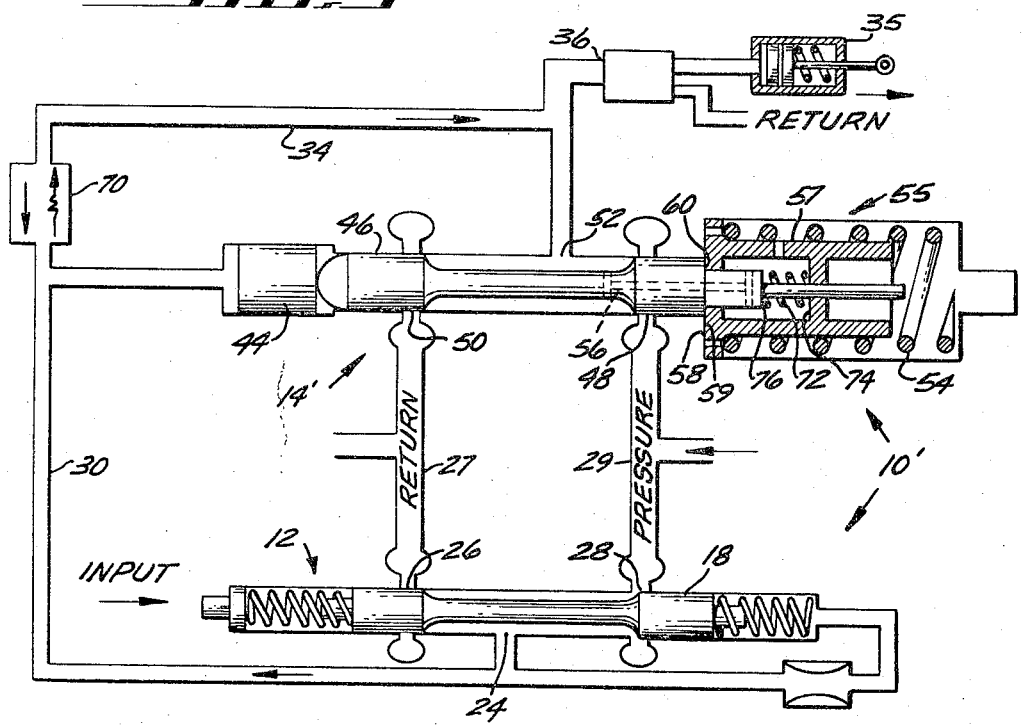
FIG. 6 is a diagrammatic representation of the valve of FIG. 5 with the first and second stage spools moved to their partially actuated positions.

The valve 10' shown in FIGS. 5 and 6 is a slightly modified form of valve 10. The valve 10' has a one-way restrictor 70 in place of the flow restrictor 32 and a lightly preloaded spring 72 which is caged between an abutment surface 74 of the sleeve 57 and an intermediate abutment surface 76 of the spool 46. As can be seen in FIG. 5, the spring 72 urges the spool 46 to the left so that a flow passage is normally present between the output port 52 and the return port 50 of the second stage 14'. When inputs are applied to the valve 10', it operates similarly to the valve 10; that is, as soon as pressure is introduced into the output line 30 by the first stage 12, the back pressure generated by the one-way flow restrictor 70 acts on the piston 44 to compress the spring 72 and move the spool 46 until its abutment surface 60 comes in contact with the abutment surface 58 of the sleeve 57 to stop the spool 46 in the position shown in FIG. 6.

As long as there is pressure in the valve output line 30, the force created by the differential area between the piston 44 and the right end 55 of the spool 46 keeps the spring 72 compressed. This means that although differential pressures across the flow restrictor 70 are capable of opening the second stage 14' to admit additional flow of pressurized fluid to the actuator 35, the second stage 14' cannot dump actuator pressure. This is not disadvantageous in brake applications since in such applications where anti-skid means 36 are used, high flow rates to pressurize the actuator 35 are often required but high flow rates through the valve 10' to reduce brake actuation pressure are never required since the anti-skid means 36 include means to dump pressurized fluid to return.

When the input to the valve 10' is reduced the return flow passes through the first stage 12 with the second stage being held in its closed position. Since the restrictor 70 is a one-way restrictor, oriented as shown, no differential pressure is generated across it by the return flow to move the spool 46 of the second stage 14' back to the left past the closed position shown in FIG. 6. However, when the static pressure in the lines 30 and 34 is reduced below a predetermined value, usually chosen as being below the actuation pressure sufficient to cause brake contact, the force generated by the differential area between the piston 44 and the right end 55 of the spool 46 is no longer sufficient to compress the spring 72. Therefore, the spool 46 moves to the left to open the flow passage between the actuator 35 and the return line 27 which abruptly dumps all remaining pressure. This is desirable because at predetermined low pressures a quantity of hydraulic fluid should be dumped rapidly to prevent dragging brakes. The light spring 72 of the second stage 14' is sized for the predetermined low pressure.

Thus there has been shown and described novel multi-stage valves which fulfill all of the objects and advantages sought therefor including being able to be used in brake systems where high flow rates and good control is required. Many changes, alterations, modifications and other uses and applications of the subject multstage valves will become apparent to those skilled in the art after considering this specification and the accompanying drawings. All such changes, alterations and modifications which do not depart from the spirit and scope of the invention are deemed to be covered by the invention which is limited only by the claims which follow.

What is claimed is:

1. A valve for controlling the operation of at least one hydraulic brake actuator, said valve including:
   a connection to a source of pressurized hydraulic fluid;
   a connection to a return of hydraulic fluid;
   an output connection for conducting hydraulic fluid to and from said brake actuator;
   a first valve stage in communication with said source connection, said return connection, and said output connection, said first valve stage including means to feed inputs thereto and means responsive to the inputs fed thereto to predeterminately conduct the pressurized hydraulic fluid from said source connection to said output connection, to predeterminately conduct the pressurized hydraulic fluid from said output connection to said return connection, and to predeterminately block flow of the hydraulic fluid between said output connection and said source and return connection;
   flow restrictor means connected between said first valve stage and said output connection to the brake actuator to generate differential pressures thereacross when said first valve stage is conducting flow of pressurized hydraulic fluid between said source connection and said output connection; and
   a second valve stage in communication with said source connection, said return connection and said output connection, said second valve stage including means in communication with the differential pressures generated by said flow restrictor means and responsive thereto to augment the flow of pressurized hydraulic fluid from said first valve stage when a predetermined differential pressure in present across said flow restrictor means.

2. The valve defined in claim 1 wherein said second valve stage includes:
   a pressure port connected to said connection to a source of pressurized hydraulic fluid;
   a return port connected to said connection to a return of hydraulic fluid;
   an output port connected to said output connection;
   a second stage valve spool located in said valve for controlling flow of hydraulic fluid between said pressure port and said output port and between said output port and said return port; and
   bias means for biasing said second stage valve spool in a predetermined position which prevents hydraulic flow between the ports, said second stage valve spool also having first and second end portions each in communication with an opposite side of said differential pressures generated by said flow restrictor means whereby predetermined differential pressures are capable of overcoming the bias of said bias means on said second stage valve spool to move said second stage valve spool to positions which allow flow of hydraulic fluid from said pressure port to said output port and from said output port to said return port.

3. The valve defined in claim 2 wherein said second stage bias means include:
   a first spring acting to urge said second stage valve spool from a position allowing flow from said pressure port to said output port to the predetermined position allowing no flow;

a second spring acting to urge said second stage valve spool from a position allowing flow from said output port to said return port to the predetermined position allowing no flow, whereby said first and second springs are sized to be overpowered by predetermined differential pressures generated by said flow restrictor means to move said spool to the flow allowing positions.

4. The valve defined in claim 3 wherein said first spring is a preloaded spring and wherein said first end portion of said second stage valve spool has a greater area exposed to pressure than said second end portion, whereby the pressures at said end portions generate force which assists in overcoming the preload of said first preloaded spring.

5. The valve defined in claim 1 wherein said second valve stage includes:
a pressure port connected to said connection to a source of pressurized hydraulic fluid;
a return port connected to said connection to a return of hydraulic fluid;
an output port connected to said output connection;
a second stage valve spool located in said valve for controlling flow of hydraulic fluid between said pressure port and said output port and between said output port and said return port;
first bias means to urge said second stage valve spool from positions allowing flow from said pressure port to said output port to a position allowing no flow; and
second bias means to urge said spool from the position allowing no flow to positions allowing flow from said output port to said return port, said second bias means being weaker than said first bias means, said second stage valve spool also having a first end portion in communication with pressure on one side of said flow restrictor means, and a second opposite end portion in communication with pressure on the opposite side of said flow restrictor means whereby predetermined pressures acting differentially on said first and second end portions are capable of overcoming said first and second bias means to move said second stage valve spool to a position allowing flow of hydraulic fluid from said pressure port to said output port.

6. The valve defined in claim 5 wherein said second stage valve spool first end portion has a greater area exposed to pressure than said second stage valve spool second end portion and wherein said flow restrictor means is a one-way restrictor which produces relatively little differential pressure thereacross when flow is from the actuator to the return of hydraulic fluid, said second bias means being sized to be overcome by the force generated by a predetermined pressure acting on the different exposed areas of said first and second end portions so that when the pressure applied to the actuator is reduced below the predetermined pressure, said second bias means are no longer overcome and said second bias means move said spool to a position to allow flow from said output port to said return port thereby relieving any pressure in the actuator to prevent dragging brakes.

7. The valve defined in claim 1 wherein said flow restrictor means include means for generating reverse differential pressure when said first valve stage is conducting a flow of hydraulic fluid from said output connection to said return connection, said second valve stage including means responsive to a predetermined reverse differential pressure to augment the flow of hydraulic flow between said output connection and said return connection.

8. The valve defined in claim 1 wherein said second valve stage includes:
a second valve stage housing;
a second stage valve spool within said second valve stage housing for controlling the augmenting flow of hydraulic fluid, said spool having first and second opposite end portions, a center portion which blocks flow of pressurized hydraulic fluid through said second valve stage and first and second positions on opposite sides of said center position which enables flow from said source connection to said output connection and from said output connection to said return connection respectively;
means to communicate the pressure on one side of said flow restrictor means to said first end portion of said second stage valve spool;
means to communicate the pressure on the other side of said flow restrictor means to said second end portion of said second stage valve spool; and
resilient means to bias said second stage valve spool to a predetermined position whereby said predetermined differential pressure from said flow restrictor means acting on said end portions of said second stage valve spool moves said spool against said resilient means to a position to augment the flow of pressurized hydraulic fluid between said first valve stage and said output connection to the brake actuator.

9. The valve defined in claim 8 wherein said resilient means include;
a first spring acting against said second stage spool to urge said spool toward said second spool position to said center position; and
a second spring which is lighter than said first spring acting against said second stage spool to urge said spool toward said first spool position to said center position which prevents flow augmentation.

10. The valve defined in claim 8 wherein said first end portion of said second stage valve spool has a greater area than said second end portion so that the pressures applied to said end portions tend to move said spool toward said second end portion.

11. The valve defined in claim 10 wherein said resilient means include:
a first preloaded spring acting against said second stage spool to urge said spool toward said second spool position to said center position; and
a second preloaded spring which is lighter than said first preloaded spring acting against said second stage spool to urge said spool toward said second position to allow flow augmentation between said output connection and said return connection, whereby a relatively small predetermined pressure acting on said second spool end portions is capable of overpowering said second preloaded spring and moving said second stage spool to said center position which prevents low augmentation.

12. The valve defined in claim 11 wherein said flow restrictor means include means which generate substantially no differential pressure when said first valve stage is conducting a flow of hydraulic fluid between said output connection and said return connection.

* * * * *